E. H. NELSON.
Cotton Cultivators.

No. 142,501. Patented September 2, 1873.

UNITED STATES PATENT OFFICE

EDMUND H. NELSON, OF GAINESVILLE, ALABAMA.

IMPROVEMENT IN COTTON-CULTIVATORS.

Specification forming part of Letters Patent No. 142,501, dated September 2, 1873; application filed April 19, 1873.

*To all whom it may concern:*

Be it known that I, EDMUND H. NELSON, of Gainesville, in the county of Sumter and State of Alabama, have invented a certain Improvement in Cotton-Cultivators, of which the following is a specification:

This invention relates to that class of machines which are used for both cultivating and thinning out rows of cotton-plants, and are supported upon a single driving-wheel. My improvement consists in the employment of a hinged frame carrying the cultivator-shovels, one of which is laterally adjustable, and arranging the driving-wheel in such a way that it shall run in the track or trench made by the fixed cultivator-shovel.

Figure 1:
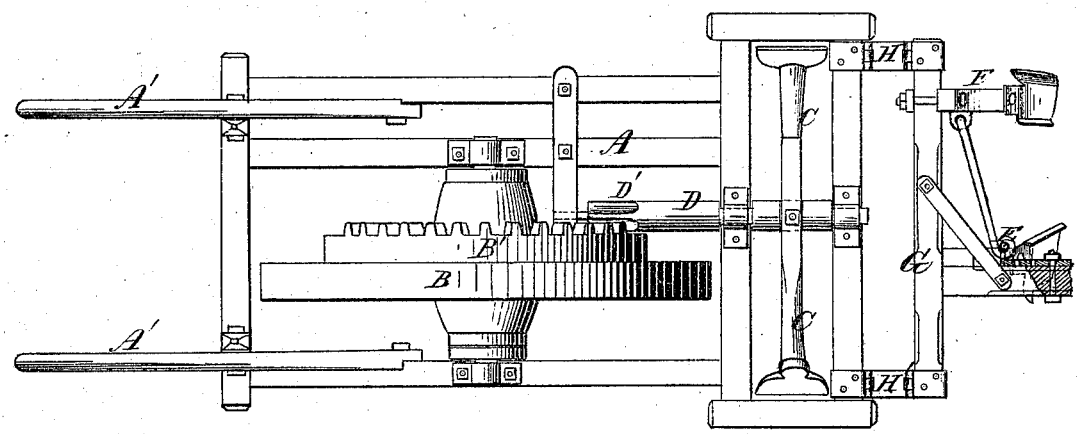
Figure 3:
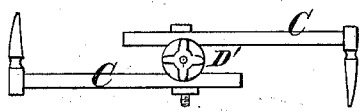
Figure 2:
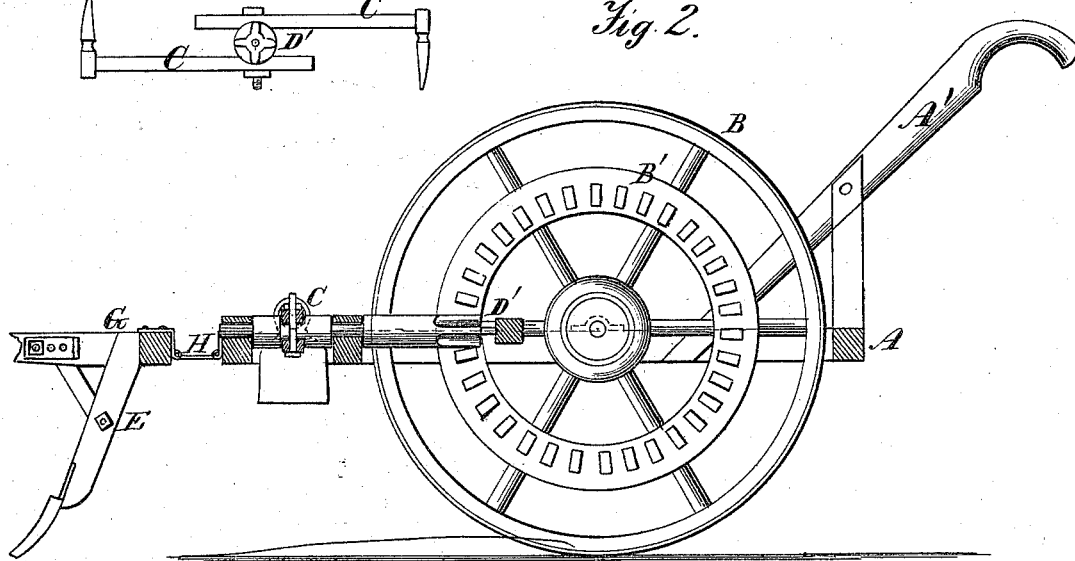

Figure 1 is a plan view of my improved cotton-cultivator. Fig. 2 is a vertical longitudinal section thereof. Fig. 3 is a detail view of the choppers.

The same letters of reference are used in all the figures in the designation of identical parts.

The main frame A is balanced upon the axle of the single driving-wheel B, placed within the frame, and is provided with handles A', by which to manipulate it. The choppers C are arranged in advance of the driving-wheel, and fixed to a horizontal longitudinally-disposed shaft, D, which has its bearings on the main frame, and carries a pinion, D', gearing into and driven by the cogged rim B' upon the inner side of the driving-wheel. The cultivator-shovels E and F are supported, in advance of the choppers, on a transversely-arranged supplemental frame, G, attached by links H and H' to the forward bar of the main frame, as clearly illustrated in Fig. 1. The shovel E remains fixed on the supplemental frame, and is arranged directly in line with the tread of the driving-wheel, so as to open a trench, in which the latter may run. The shovel F is laterally adjustable, and by its adjustment the width of the ridge of plants may be regulated.

The chopper-shaft is arranged on a line about midway between the shovels. The frame supporting the latter being flexibly connected to the main frame will readily accommodate itself with its shovels to surface inequalities, and it may easily be raised to lift the shovels out of the ground by bearing down on the handles of the main frame.

What I claim as my invention, and desire to secure by Letters Patent, is—

In a cotton-cultivator of the character described, the supplemental frame G linked to the forward end of the main frame and carrying a laterally-adjustable shovel, F, and a fixed shovel, E, the latter standing directly in line with the tread of the single driving-wheel B, all substantially as and for the purpose specified.

In testimony whereof I have signed my name to this specification in the presence of two subscribing witnesses.

EDMUND H. NELSON.

Witnesses:
B. J. WILLIAMSON,
JNO. W. BRADSHAW.